US011933615B2

(12) United States Patent
Peng et al.

(10) Patent No.: US 11,933,615 B2
(45) Date of Patent: Mar. 19, 2024

(54) ESTIMATED TIME OF ARRIVAL CALCULATING METHOD AND SYSTEM AND MOBILE MACHINE USING THE SAME

(71) Applicant: UBKANG (QINGDAO) TECHNOLOGY CO., LTD., Qingdao (CN)

(72) Inventors: Kang-Hao Peng, Pasadena, CA (US); Dejun Guo, Pasadena, CA (US); huan Tan, Pasadena, CA (US); Yang Shen, Los Angeles, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 437 days.

(21) Appl. No.: 17/158,032

(22) Filed: Jan. 26, 2021

(65) Prior Publication Data

US 2022/0236071 A1 Jul. 28, 2022

(51) Int. Cl.
*G01C 21/00* (2006.01)
*G01C 21/20* (2006.01)

(52) U.S. Cl.
CPC ......... *G01C 21/005* (2013.01); *G01C 21/206* (2013.01)

(58) Field of Classification Search
None
See application file for complete search history.

(56) References Cited

U.S. PATENT DOCUMENTS

| 10,254,119 | B2* | 4/2019 | Wang | H04W 4/029 |
|---|---|---|---|---|
| 10,948,301 | B2* | 3/2021 | Wang | G06F 3/00 |
| 2014/0180526 | A1* | 6/2014 | Deshpande | G05D 1/0248 |
| | | | | 701/25 |
| 2016/0033289 | A1* | 2/2016 | Tuukkanen | G01C 21/3415 |
| | | | | 701/537 |
| 2017/0132934 | A1* | 5/2017 | Kentley | G08G 1/202 |
| 2019/0257658 | A1* | 8/2019 | Wang | G01C 21/3446 |
| 2022/0339786 | A1* | 10/2022 | Guo | G06T 7/50 |
| 2023/0043557 | A1* | 2/2023 | Golding | G01C 21/36 |
| 2023/0124864 | A1* | 4/2023 | Levihn | G05D 1/0221 |
| | | | | 706/23 |

FOREIGN PATENT DOCUMENTS

| CN | 110942211 A | | 3/2020 |
|---|---|---|---|
| WO | WO-2021022487 A1 | * | 2/2021 |
| WO | WO-2022126354 A1 | * | 6/2022 |

* cited by examiner

*Primary Examiner* — Jeffrey C Boomer

(57) ABSTRACT

ETA (estimated time of arrival) calculation for a mobile machine is disclosed. The ETA of the mobile machine to a destination is calculated by obtaining a current pose of the mobile machine, obtaining a global path from the current pose of the mobile machine to the destination, obtaining a local path, calculating a dynamic ETA for each pair of the consecutive poses in the local path and summing the calculated dynamic ETAs, calculating a baseline ETA for each pair of consecutive poses from a pose in the global path that is closest to the last pose in the local path to the last pose in the global path and summing the calculated baseline ETAs, and obtaining a total ETA to the destination based on the dynamic ETA and the baseline ETA.

20 Claims, 11 Drawing Sheets

ESTIMATED TIME OF ARRIVAL CALCULATING METHOD AND SYSTEM AND MOBILE MACHINE USING THE SAME

BACKGROUND

1. Technical Field

The present disclosure relates to estimated time of arrival (ETA) calculation, and particularly to an ETA calculating method as well as a system and a mobile machine using the same.

2. Description of Related Art

As artificial intelligence (AI) techniques getting mature, mobile machines such as mobile robots or vehicles are gradually endowed with automatic navigation capabilities so as to perform tasks such as movement and transportation in an automatic way. In addition, as the pandemic rage the whole word in these two years, many unmanned vehicles (e.g., service robots and drones) are involved in many tasks such as customer service and express delivery so as to prevent from the affection of lockdown and to meet public health needs, which require accurate ETA to, for example, arrange the tasks in a better manner or free the user from waiting.

A kind of the existing ETA calculation methods are analyzation based, which calculate a map pixel-by-pixel based on the kinodynamic constraints (e.g., speed limits and acceleration limits) of a mobile machine, and are computationally heavy because the computation time of 500 ms or so is required for each path planning iteration, while the effect of the replanning of the global path is not taken into consideration. Another kind of existing ETA calculation methods are machine learning based, which train models for a mobile machine using a dataset having thousands of path data recordings, and cannot be adapted to another mobile machine with different hardware/software configurations (e.g., speed limits) because an additional similar amount of path data needs to record so as to retrain the models for the mobile machine.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1:
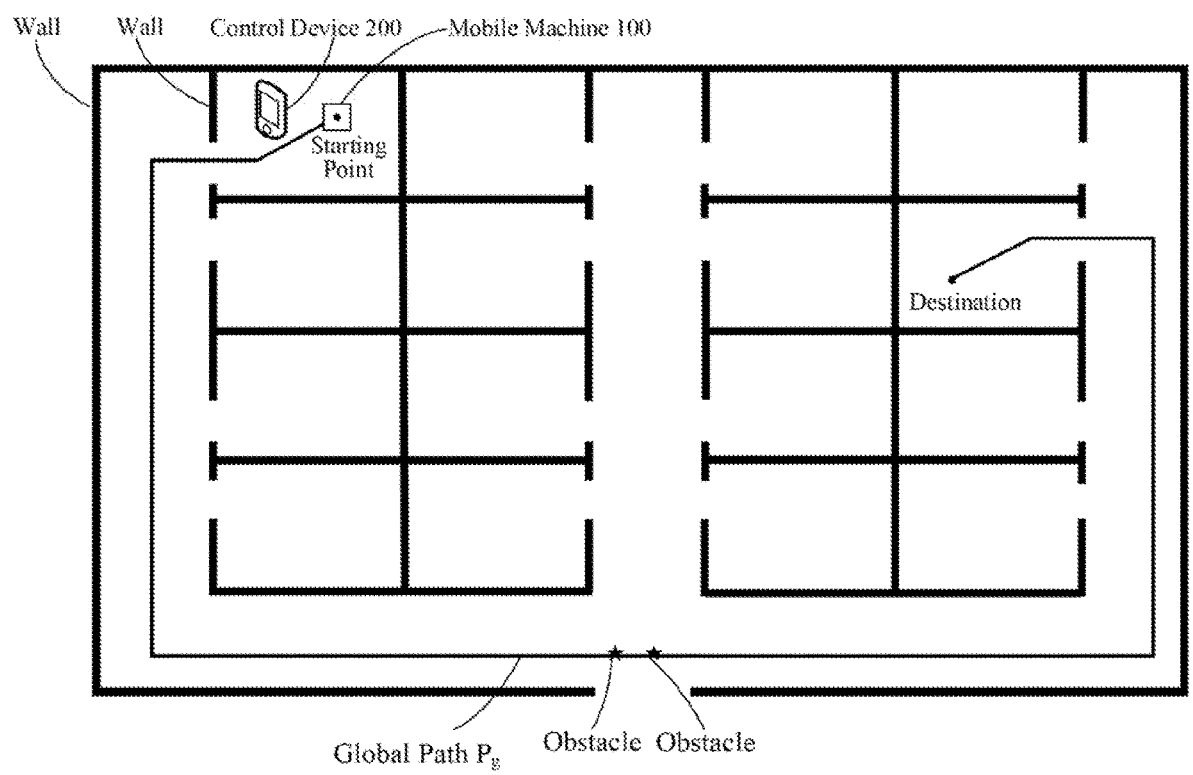
FIG. 1 is a schematic diagram of navigating a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to ETA calculation for a mobile machine. As used herein, the term "estimated time of arrival" (ETA) refers to the time when a ship, vehicle, aircraft, cargo, emergency service or person is expected to arrive at a destination, the term "mobile machine" refers to a machine such as a vehicle or a mobile robot that has the capability to move around in its environment, the term "sensor" refers to a device, module, machine, or subsystem such as ambient light sensor and image sensor whose purpose is to detect events or changes in its environment and send the information to other electronics (e.g., processor), the term "navigation" refers to the process of monitoring and controlling the movement of a mobile machine from one place to another, and the term "collision avoidance" refers to prevent or reduce the severity of a collision.

FIG. 1 is a schematic diagram of navigating a mobile machine 100 according to some embodiments of the present disclosure. The mobile machine 100 (e.g., a service robot) is navigated in its environment (e.g., an office) while dangerous situations such as collisions and unsafe conditions (e.g., falling, extreme temperature, radiation, and exposure) are prevented. In the indoor navigation, the mobile machine 100 is navigated from a starting point (e.g., the location where the mobile machine 100 is located) to a destination (e.g., the location of the goal of navigation which is indicated by the user or the navigation/operation system of the mobile machine 100), while walls and obstacles (e.g., furniture, human, pet, and garbage) has to be avoided so as to prevented the above-mentioned dangerous situations. In some embodiments, for realizing the navigation of the mobile machine 100, the map for the environment has to be built, the position of the mobile machine 100 in the environment has to be determined, and path(s) for the mobile machine 100 to move from the starting point to the destination has to be planned.

In some embodiments, ETA of the mobile machine 100 to arrive at the destination (and other places in the path between the starting point and the destination) may be calculated based on the information related to the navigation of the mobile machine 100, for example, the built map, the position of the mobile machine 100, and/or the planned path(s). Then, the calculated ETA of the mobile machine 100 can be, for example, provided to its navigation/operation system or its user (through, for example, a control device 200), so as to take as a parameter for determining the policy of the navigation (e.g., shortest path determination), a condition for determining the task distribution among multiple mobile machines, or a referenced arrival time of the mobile machine 100.

In some embodiments, the navigation and/or the ETA calculation of the mobile machine 100 may be actuated through the mobile machine 100 itself (e.g., a control interface on the mobile machine 100) or the control device 200 such as a remote control of the mobile machine 100 by, for example, providing a request for the navigation and/or the ETA of the mobile machine 100.

Figure 2:
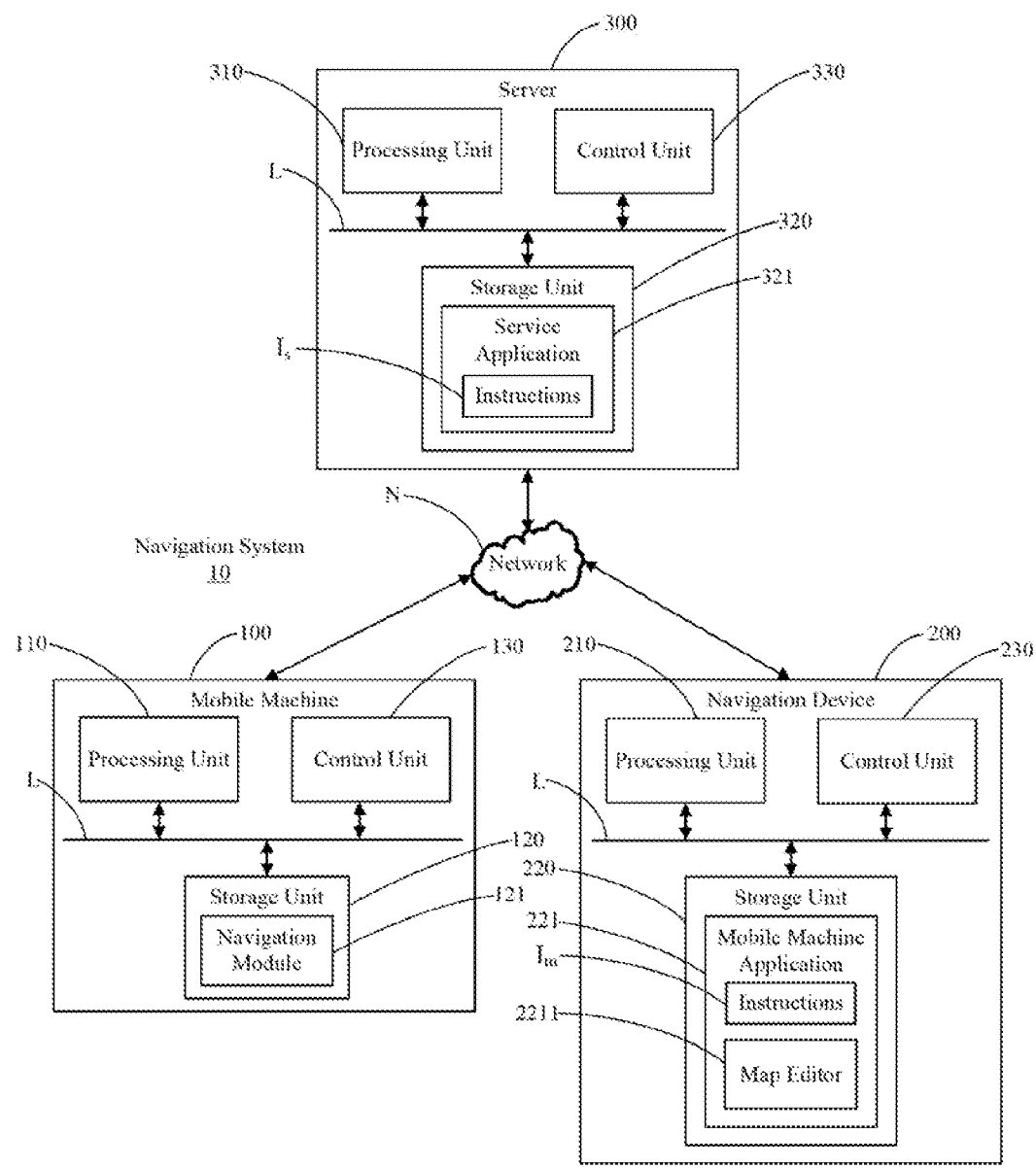
FIG. 2 is a schematic block diagram illustrating a navigation system according to some embodiments of the present disclosure.

FIG. 2 is a schematic block diagram illustrating a navigation system 10 according to some embodiments of the present disclosure. The navigation system 10 may include the mobile machine 100, the control device 200, and a server 300 that communicate over network(s) N. The network(s) N may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks. The calculated ETA of the mobile machine 100 to arrive the destination may be transmitted to the control device 200 (and the server 300) via the network(s) N by the network interface(s) 1311 in response to, for example, a request for the ETA of the mobile machine 100 to the destination that is received from the control device 200 or the server 300, or be transmitted to the server 300 and then forwarded to the control device 200 by the server 300. In other embodiments, the navigation system 10 may only include the mobile machine 100 and the control device 200 (i.e., not include the server 300), and the calculated ETA of the mobile machine 100 may be transmitted directly to the control device 200 via the network(s) N (e.g., Wi-Fi network, Bluetooth network, or mobile network) by the network interface(s) 1311.

The mobile machine 100 may be a mobile robot such as a wheeled robot or a humanoid robot, which may include a processing unit 110, a storage unit 120, and a control unit 130 that communicate over one or more communication buses or signal lines L. It should be noted that, the mobile machine 100 is only one example of mobile machine, and the device 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing functions (e.g., map building, path planning, and ETA calculation) related to the navigation (and ETA calculation) of the mobile machine 100, which may be stored in the one or more memories (and the one or more non-transitory computer readable storage mediums). In other embodiments, the mobile machine 100 may be a vehicle such as a car, a drone, or a vessel.

The control device 200 may be, for example, a remote control, a smart phone, a tablet computer, a notebook computer, a desktop computer, or other electronic device, which may include a processing unit 210, a storage unit 220, and a control unit 230 that communicate over one or more communication buses or signal lines L. It should be noted that, the control device 200 is only one example of control device for the mobile machine 100, and the control device 200 may have more or fewer components (e.g., unit, subunits, and modules) than shown in above or below, may combine two or more components, or may have a different configuration or arrangement of the components.

The processing unit 210 executes various (sets of) instructions stored in the storage unit 220 that may be in form of software programs to perform various functions for the control device 200 and to process related data, which may include one or more processors (e.g., CPU). The storage unit 220 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 230 may include various controllers (e.g., camera controller, display controller, and physical button controller) and peripherals interface for coupling the input and output peripheral of the control device 200, for example, external port (e.g., USB), wireless communication circuit (e.g., RF communication circuit), audio circuit (e.g., speaker circuit), sensor (e.g., inertial measurement unit (IMU)), and the like, to the processing unit 210 and the storage unit 220.

In some embodiments, the storage unit 220 may include a mobile machine application 221 which may be stored in the one or more memories (and the one or more non-transitory computer readable storage mediums). The mobile machine application 221 may be a mobile application (app) (or a computer program) for (the operation system of) the control device 200, which has a map editor 2211 and instructions $I_m$ for implementing related functions (e.g., settings and controls) of the mobile machine 100. The map editor 2211 may have instructions for editing maps for the mobile machine 100, for example, remove noise points or obstacles from a built map (received from the mobile machine 100), and adding navigation node/path, virtual wall to the built map. The map editor 2211 may be a module separated from other modules of the mobile machine application 221.

The server 300 may be, for example, on or more server computers, which may include a processing unit 310, a storage unit 320, and a control unit 330 that communicate over one or more communication buses or signal lines L. The server 300 may be a part of a base station that communicates with the mobile machine 100 and the control device 200 via the network(s) N (e.g., Wi-Fi network or mobile network). It should be noted that, the server 300 is only one example of server for the mobile machine 100 and the control device 200, and the server 300 may have more or fewer components (e.g., unit, subunits, and modules) than shown in above or below, may combine two or more components, or may have a different configuration or arrangement of the components.

The processing unit 310 executes various (sets of) instructions stored in the storage unit 320 that may be in form of software programs to perform various functions for the server 300 and to process related data, which may include one or more processors (e.g., CPU). The storage unit 320 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 330 may include various controllers (e.g., display controller and physical button controller) and peripherals interface for coupling the input and output peripheral of the server 300, for example, external port (e.g., USB), wireless communication circuit (e.g., RF communication circuit), audio circuit (e.g., speaker circuit), and the like, to the processing unit 310 and the storage unit 320. In some embodiments, the storage unit 320 may include a service application 321 which may be stored in the one or more memories (and the one or more non-transitory computer readable storage mediums). The service application 321 may be a computer program for (the operation system of) the server 300, which has instructions $I_s$ for implementing related services (e.g., map manager for the mobile machine 100, digital distribution platform for the control device 200, and navigation task manager for the mobile machine 100 and the control device 200) for the mobile machine 100 and the control device 200.

Figure 3:
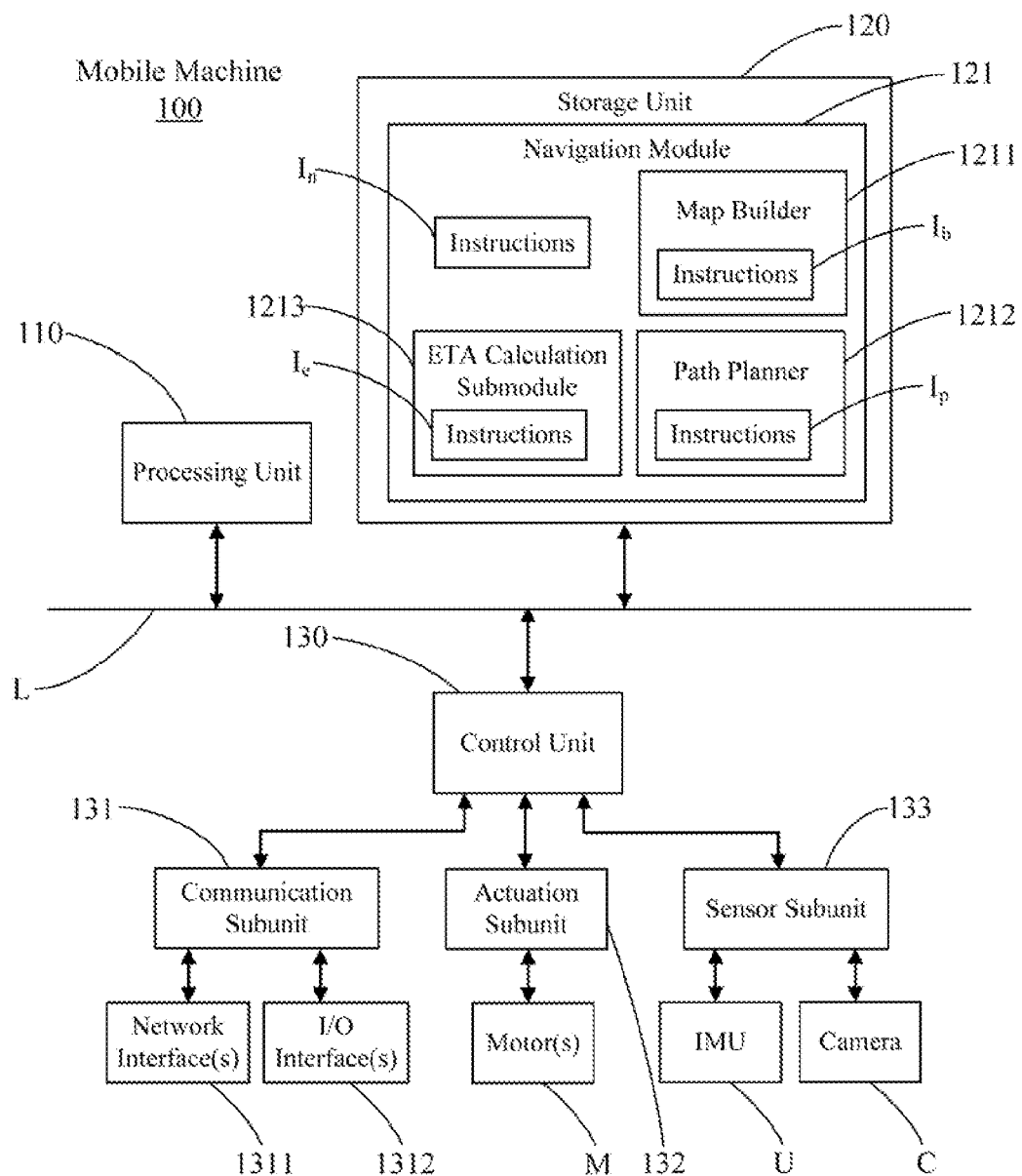
FIG. 3 is a schematic block diagram illustrating a mobile machine in the navigation system of FIG. 2.

FIG. 3 is a schematic block diagram illustrating the mobile machine 100 in the navigation system 10 of FIG. 2. The navigation module 121 in the storage unit 120 of the mobile machine 100 may be a software module (of the operation system of the mobile machine 100), which has instructions $I_n$ (e.g., instruction for actuating motor(s) M of the mobile machine 100 to move the mobile machine 100) for implementing the navigation of the mobile machine 100, a map builder 1211, path planner(s) 1212, and an ETA calculation submodule 1213. The map builder 1211 may be a software module having instructions $I_b$ for building map for the mobile machine 100. The path planner 1212(s) may be software module(s) having instructions $I_p$, for planning path for the mobile machine 100. In some embodiments, the path planner 1212(s) may include a global path planner $R_g$ (not shown) for planning global paths $P_g$ (see FIG. 1 and FIG. 4B) for the mobile machine 100 and a local path planner $R_l$ (not shown) for planning local paths $P_l$ (see FIG. 4B and FIG. 4C) for the mobile machine 100. The global path planner $R_g$ may be, for example, a path planner based on Dijkstra's algorithm. The local path planner $R_l$ may be, for example, a path planner based on TEB algorithm. The ETA calculation submodule 1213 may be a software module having instructions $I_c$ for implementing the ETA calculation for the mobile machine 100 so as to calculate an ETA of the mobile machine 100 to arrive the destination. Each of the map builder 1211, the path planner(s) 1212, and the ETA calculation submodule 1213 may be a submodule separated from the instructions $I_n$ or other submodules of the navigation module 121, or a part of the instructions $I_n$ for implementing the navigation of the mobile machine 100. The ETA calculation submodule 1213 may further have data (e.g., input/output data and temporary data) related to the ETA calculation of the mobile machine 100 which may be stored in the one or more memories and accessed by the processing unit 110. In some embodiments, the ETA calculation submodule 1213 may be a module in the storage unit 120 that is separated from the navigation module 121.

In some embodiments, the instructions $I_n$ may include instructions for implementing collision avoidance of the mobile machine 100 (e.g., obstacle detection and path replanning). In addition, the global path planner $R_g$ may replan the global path(s) $P_g$ (i.e., plan new global path(s) $P_g$) to detour in response to, for example, the original global path(s) being blocked (e.g., blocked by an unexpected obstacle) or inadequate for collision avoidance (e.g., impossible to avoid a detected obstacle when adopted). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, the path planner(s) 1212, and an ETA calculation module like the ETA calculation submodule 1213, and one or more processors (e.g., MPU and MCU) for executing the stored instructions $I_n$, $I_b$, $I_p$ and $I_c$ to implement the navigation of the mobile machine 100.

The mobile machine 100 may further include a sensor subunit 133 which may include a set of sensor(s) and related controller(s), for example, an IMU U (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device 200 (and the server 300) via the network(s) N and I/O interface(s) 1312 (e.g., a physical button), and the like. The actuation subunit 132 is coupled to component(s)/device(s) for implementing the motions of the mobile machine 100 by, for example, actuating motor(s) M of wheels and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

In some embodiments, the map builder 1211, the path planner(s) 1212, the sensor subunit 133, and the motor(s) M (and wheels and/or joints of the mobile machine 100 coupled to the motor(s) M) jointly compose a (navigation) system which implements map building, (global and local) path planning, and motor actuating so as to realize the navigation of the mobile machine 100.

In some embodiments, the various components shown in FIG. 2 and FIG. 3 may be implemented in hardware, software or a combination of both hardware and software. Two or more of the processing unit 110, the storage unit 120, the control unit 130, the navigation module 121, the processing unit 210, the storage unit 220, the control unit 230, the processing unit 310, the storage unit 320, the control unit 330, and other units/subunits/modules may be implemented on a single chip or a circuit. In other embodiments, at least a part of them may be implemented on separate chips or circuits.

ETA Calculation with Dynamic ETA and Baseline ETA

Figure 4A:
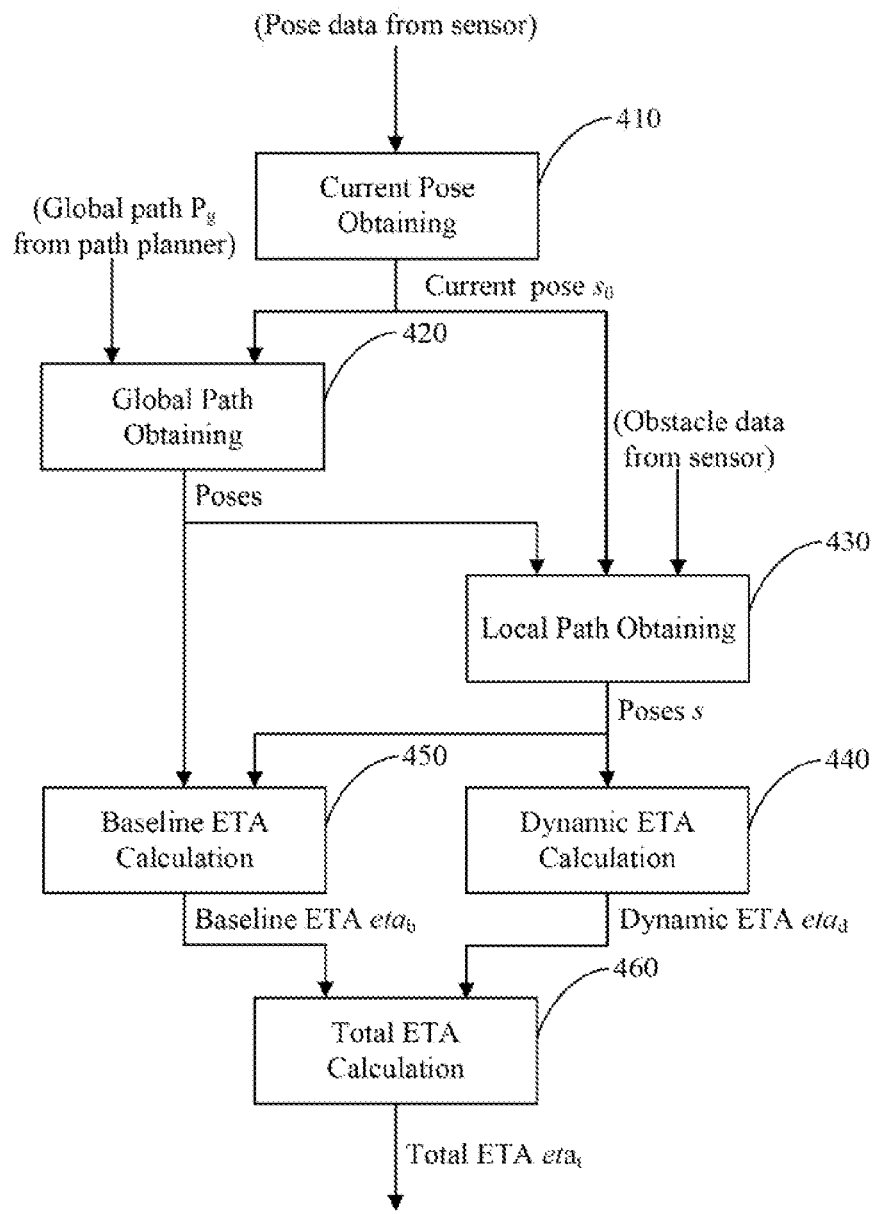
FIG. 4A is a schematic block diagram of an example of ETA calculation for the mobile machine of FIG. 3.

FIG. 4A is a schematic block diagram of an example of ETA calculation for the mobile machine 100 of FIG. 3. In some embodiments, an ETA calculating method for the mobile machine 100 is implemented in the mobile machine 100 to provide the ETA of the mobile machine 100 to arrive the destination by, for example, storing (sets of) instructions $I_e$ corresponding to the ETA calculating method as the ETA calculation submodule 1213 in the storage unit 120 and executing the stored instructions $I_e$ through the processing unit 110. The ETA calculating method may be performed in response to, for example, a request for the ETA of the mobile machine 100 to the destination from, for example, (the navigation/operation system of) the mobile machine 100 itself, the control device 200, or the server 300. Then, the ETA calculating method may be re-performed, for example, at a specific interval (e.g., 1 second) until the mobile machine 100 arrives the destination.

According to the ETA calculating method, the processing unit 110 obtains a current pose $s_0$ of the mobile machine 100 (block 410). In some embodiments, the current pose $s_0$ are collected through (the IMU U of) the sensor subunit 133 of the processing unit 110.

Figure 4B:
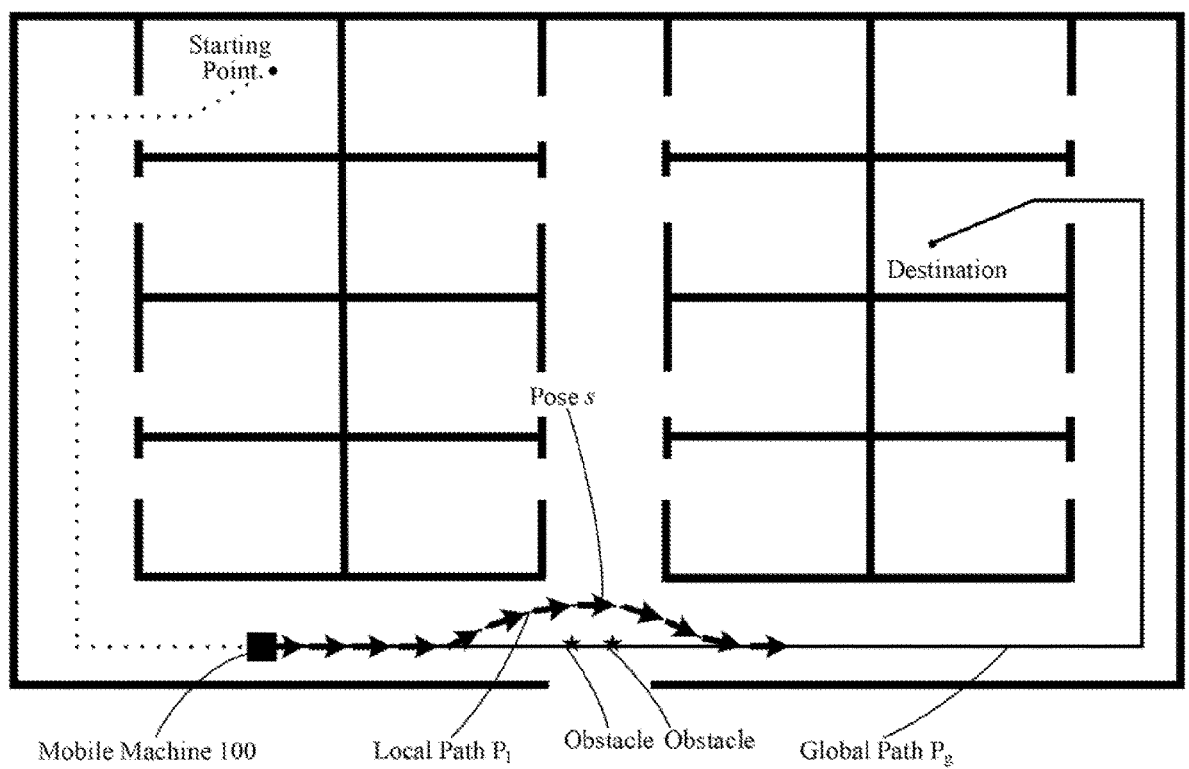
FIG. 4B is a schematic diagram of an example of path planning for the mobile machine of FIG. 3.

FIG. 4B is a schematic diagram of an example of path planning for the mobile machine 100 of FIG. 3. The processing unit 110 further obtains global path(s) $P_g$ (see also FIG. 1) from the current pose $s_0$ of the mobile machine 10 to the destination (block 420). In some embodiments, the global path $P_g$ includes a plurality of poses for the mobile machine 100. Each of the poses includes a position (e.g., a coordinate in a coordinate system) and a posture (e.g., an Euler angle in the coordinate system) for the mobile machine 100. In addition the global path(s) $P_g$ may be planned by the global path planner $R_g$ based on map(s) built by the map builder 1211 through, for example, simultaneous localization and mapping (SLAM). In other embodiments, in the case that, for example, the global path planned by the global path planner $R_g$ only includes the position for the mobile machine 100, the posture for the mobile machine 100 may be calculated based on the position so as to obtain the pose of the global path planner $R_g$ which includes the position and the posture.

Figure 4C:
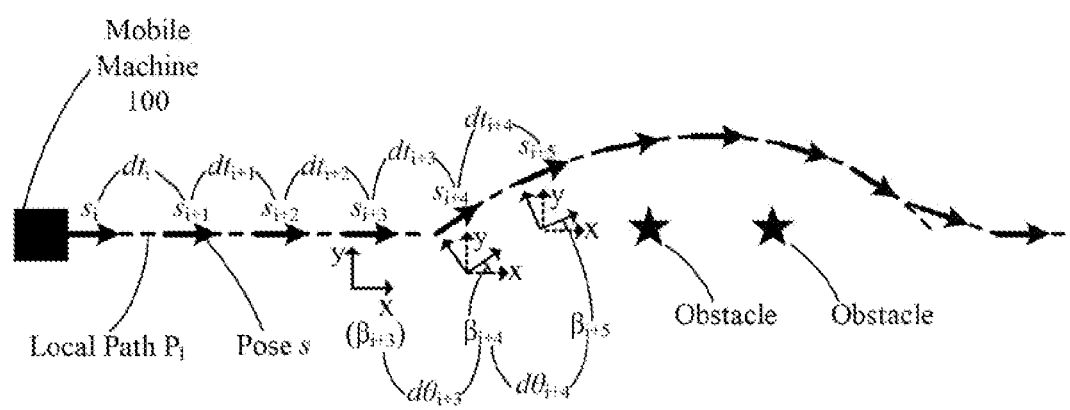
FIG. 4C is a schematic diagram of a local path in the example of path planning of FIG. 4B.

The processing unit 110 further obtains local path(s) $P_l$ (see FIG. 4B and FIG. 4C) that are planned based on the global path $P_g$ and the current pose $s_0$ of the mobile machine 100 (block 430). The local path $P_l$ may be planned further based on other data collected through the sensor subunit 133 of the mobile machine 100. For example, images may be collected through a camera C of the sensor subunit 133, and the collected images may be analyzed so as to identify obstacles, so that the local path(s) $P_l$ can be planned with reference to the identified obstacles, and the obstacles can be avoided by moving the mobile machine 100 according to the planned local path(s) $P_l$. FIG. 4C is a schematic diagram of the local path $P_l$ in the example of path planning of FIG. 4B. The local path $P_l$ includes a plurality of poses s for the mobile machine 100. Each of the poses s includes a position (e.g., a coordinate in a coordinate system) and a posture (e.g., an Euler angle in the coordinate system) for the mobile machine 100. The motor(s) M of the mobile machine 100 may be actuated according to the poses s in the local path $P_l$ so that the mobile machine 100 is moved according to the local path(s) $P_l$, thereby implementing the navigation of the mobile machine 100. In some embodiments, the local path(s) $P_l$ may be planned through the local path planner $R_l$ by generating the local path $P_l$ based on the global path $P_g$ while taking the identified obstacles into consideration (e.g., avoiding the identified obstacles).

In some embodiments, in the case that, for example, a path planner based on TEB is used as the local path planner $R_l$, if it is assumed that:

no obstacle is on global paths $P_g$ (see FIG. 1);

local paths $P_l$ (see FIG. 4B) highly coincides with the corresponding global path $P_g$ (e.g., only the local paths $P_l$ related to obstacles do not coincide);

either linear and angular speeds or linear and angular accelerations of the mobile machine 100 are at their maximum values at any time instant; and optionally, acceleration constraints (i.e., maximum linear acceleration and maximum angular acceleration) of the mobile machine 100 may be ignored (because they will affect only a limited portion of the paths);

as a result, between two consecutive poses s, time spent (i.e., pose-to-pose ETA) will be lower restricted by maximum linear and angular speeds.

The processing unit 110 further calculates a dynamic ETA $eta_d$ for each pair of the consecutive poses s in the local path $P_l$ by performing a pose-to-pose ETA calculation on the pair of the consecutive poses s and summing the calculated dynamic ETA $eta_d$ for all the pairs of the consecutive poses s (block 440). The pose-to-pose ETA dt is a time spend for the mobile machine 100 to be navigated from the last pose $s_i$ to the current pose $s_{i+1}$ (see FIG. 4C). In some embodiments, each pair of the consecutive poses s includes the last pose $s_i$ and the current pose $s_{i+1}$ that have a short distance (e.g., a distance <10 cm) therebetween.

Figure 4D:
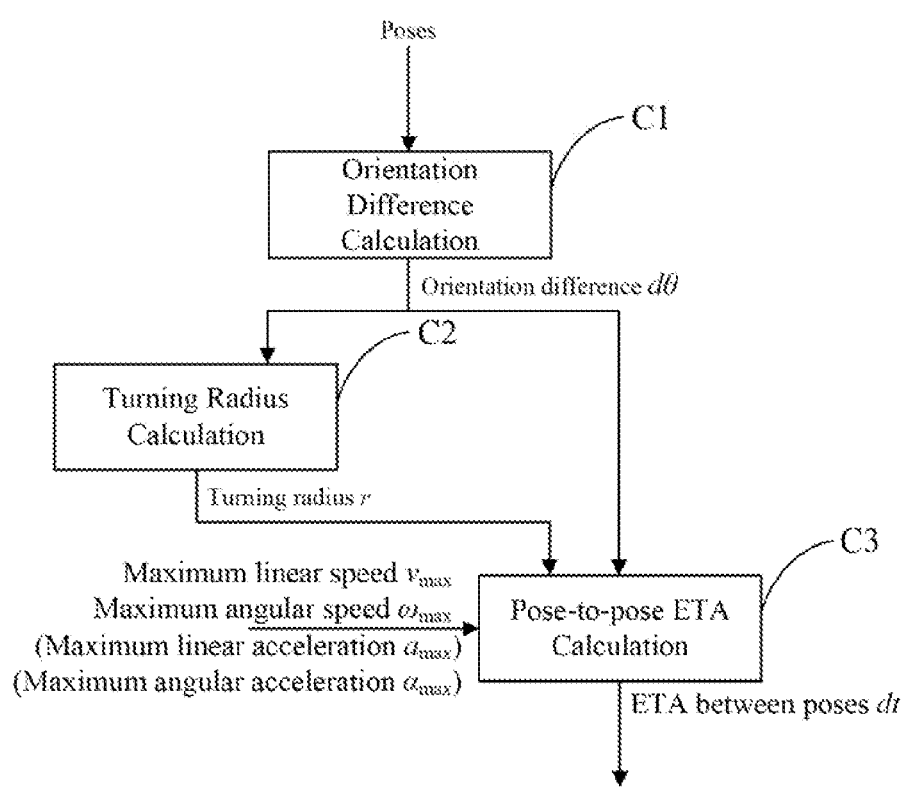
FIG. 4D is a schematic block diagram of an example of pose-to-pose ETA calculation in the example of ETA calculation of FIG. 4A.

FIG. 4D is a schematic block diagram of an example of pose-to-pose ETA calculation in the example of ETA calculation of FIG. 4A. In some embodiments, in a pose-to-pose ETA calculation performed on each pair of the consecutive poses in the global path $P_g$ or the consecutive poses s in the local path $P_l$, the processing unit 110 calculates an orientation difference dθ of the pair of the consecutive poses (block C1). In some embodiments, the yaw angle between the current pose $s_{i+1}$ and the last pose $s_i$ and may be taken as the orientation θ of the current pose $s_{i+1}$, and the orientation difference dθ between the current pose $s_{i+1}$ and the last pose $s_i$ may be calculated through an equation of:

$$d\theta = \text{pose}[i+1].yaw - \text{pose}[i].yaw;$$

where, pose[i+1].yaw is the yaw angle of the current pose $s_{i+1}$, and pose[i].yaw is the yaw angle of the last pose $s_i$. For example, in the case that the yaw angle of pose $s_{i+3}$ is 0, the yaw angle of pose $s_{i+4}$ is $\beta_{i+4}$, and the yaw angle of pose $s_{i+5}$ is $\beta_{i+5}$, the orientation difference $d\theta_{i+3}$ between pose $s_{i+3}$ and pose $s_{i+4}$ will be $\beta_{i+4}$, and the orientation difference $d\theta_{i+4}$ between pose $s_{i+4}$ and pose $s_{i+5}$ will be $\beta_{i+5} - \beta_{i+4}$ (see FIG. 4C).

The processing unit 110 further calculates a turning radius r of the pair of the consecutive poses based on the orientation difference dθ of the pair of the consecutive poses (block C2). In some embodiments, the turning radius r of the pair of the consecutive poses may be calculated through an equation of:

$$r = ed/(2\sin(d\theta/2));$$

where, ed is an Euclidean distance between the last pose $s_i$ and the current pose $s_{i+1}$, and sin( ) is the sine function. Due to numerical error will occur when dθ=0, under a tolerable small error, if $|d\theta| < \varepsilon$ (e.g., $\varepsilon = 0.0001$), it may reassign dθ=ε, and r=ed/ε.

The processing unit 110 further calculates the (pose-to-pose) ETA dt for the pair of the consecutive poses based on the orientation difference dθ, turning radius r of the pair of the consecutive pose, the maximum linear speed $v_{max}$ of the mobile machine 100, and the maximum angular speed $\omega_{max}$ of the mobile machine 100 (block C3).

According to the kinodynamic constraints, the linear speed and angular speed of the mobile machine 100 should not exceed their maximum values. Hence, speed constraints (i.e., the maximum linear speed $v_{max}$ and the maximum angular speed $\omega_{max}$) of the processing unit 110 have to be considered, and the ETA dt has to be calculated based on the speed constraints of the mobile machine 100. Suppose that v is the (current) linear speed of the mobile machine 100, and ω is the (current) angular speed of the mobile machine 100, then:

$$v = rd\theta/dt < v_{max}; \text{ and}$$

$$\omega = d\theta/dt < \omega_{max}.$$

That is, the linear speed v of the mobile machine 100 is capped by the max linear speed $v_{max}$, and the angular speed ω of the mobile machine 100 is capped by the max angular speed $\omega_{max}$. Hence, in some embodiments, the processing unit 110 may calculate the ETA dt for the pair of the consecutive poses (block C3) through an equation of:

$$dt = \max(rd\theta/v_{max}, d\theta/\omega_{max});$$

where, max( ) is the function for finding maximum between two numbers. In other embodiments, in addition to the speed constraints, the ETA dt may be calculated further based on acceleration constraints (i.e., the maximum linear acceleration and the maximum angular acceleration) of the mobile machine 100, thereby further improving the accuracy of the calculated ETA dt. Suppose that a is the (current) linear acceleration of the mobile machine 100, and a is the (current) angular acceleration of the mobile machine 100, then:

$$a = (v-v')/dt < a_{max}; \text{ and}$$

$$\alpha = (\omega-\omega')/dt < \alpha_{max};$$

where, v' is the linear speed of the mobile machine 100 at the last pose $s_i$, ω' is the angular speed of the mobile machine 100 at the pose before the last pose $s_{i-1}$, $a_{max}$ is the maximum linear acceleration of the mobile machine 100, and $\alpha_{max}$ is the maximum angular acceleration of the mobile machine 100. If the mobile machine 100 is at the first pose of the path, v'=v and w'=ω; otherwise, v'=rdθ/dt and w'=dθ/dt.

That is, the linear acceleration a of the mobile machine 100 is capped by the maximum linear acceleration $a_{max}$, and the angular acceleration α of the mobile machine 100 is capped by the maximum angular acceleration $\alpha_{max}$. Hence, the processing unit 110 may calculate the ETA dt for the pair of the consecutive poses (block C3) through an equation of:

$$dt = \max(rd\theta/v_{max}, d\theta/\omega_{max}, (-v'+\text{sqrt}(v'v'+2a_{max}rd\theta))/a_{max}, (-\omega'\text{sqrt}(\omega'\omega'+2\alpha_{max}d\theta))/\alpha_{max});$$

where, sqrt( ) is the function for calculating the square root of a number. In some embodiments, in the case that, for example, a path planner based on TEB is used as the local path planner $R_l$, the calculated dynamic ETA $eta_d$ for all the pairs of the consecutive poses s are summed (block 440) by simply adding all the ETAs dt for all the pairs of the consecutive poses in the local path $P_l$ together.

Figure 4E:
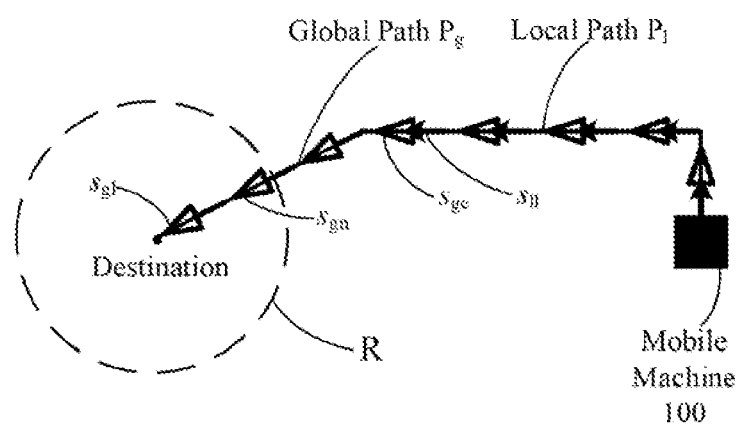
FIG. 4E is a schematic diagram of the poses in the paths near to the destination in the example of path planning of FIG. 4B.

FIG. 4E is a schematic diagram of the poses in the paths near to the destination in the example of path planning of FIG. 4B. According to the ETA calculating method, the processing unit 110 further calculates a baseline ETA $eta_b$ for each pair of the consecutive poses from the pose $s_{gc}$ in the global path $P_g$ that is closest to the last pose $s_{ll}$ in the local path $P_l$ to the last pose $s_{gl}$ in the global path $P_g$ by performing the pose-to-pose ETA calculation on the pair of the consecutive poses and sums the calculated baseline ETA $eta_b$ for all the pairs of the consecutive poses (block 450).

The processing unit 110 further obtains a total ETA $eta_t$ to the destination based on the dynamic ETA $eta_d$ and the baseline ETA $eta_b$ (block 460). In some embodiments, the processing unit 110 may calculate the total ETA $eta_t$ through an equation of:

$$eta_t = eta_d + eta_b.$$

ETA Calculation with Dynamic ETA, Baseline ETA and Near-Goal ETA

Figure 5:
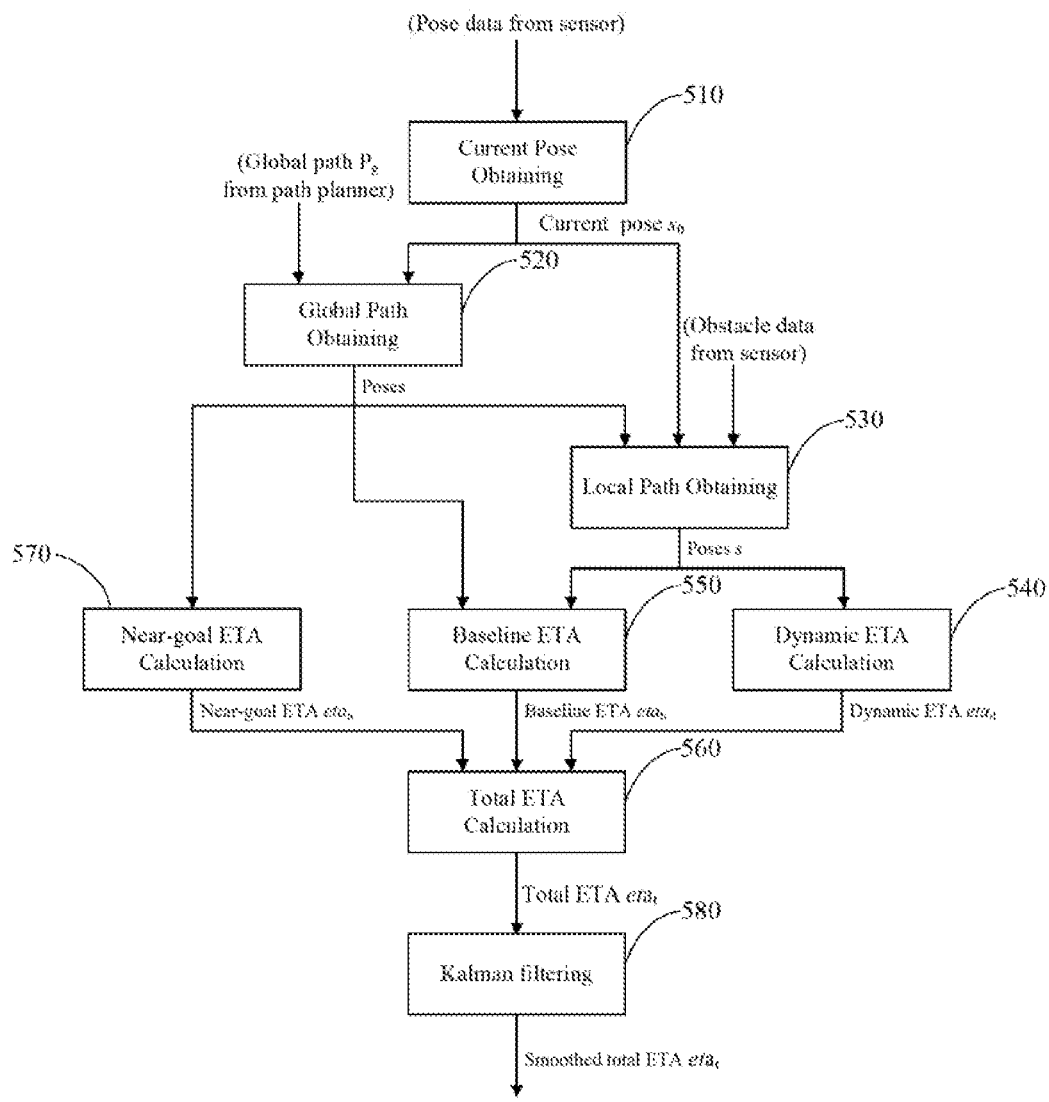
FIG. 5 is a schematic block diagram of another example of ETA calculation for the mobile machine of FIG. 3.

Since the navigation of the mobile machine 100 usually slightly change when the mobile machine 100 is about to reach the destination so that the mobile machine 100 is moved more slowly and precisely, the maximum linear speed $v_{max}$ and the maximum angular speed $\omega_{max}$ of the mobile machine 100 will become smaller when the mobile machine 100 is moved into a certain range R (e.g., 40 cm) from the destination. In this case, in addition to calculate the total ETA $eta_t$ based on the dynamic ETA etas and the baseline ETA $eta_b$ that consider the whole local path $P_l$ and global path $P_g$ as in the example of FIG. 4A, the total ETA $eta_t$ may be calculated further based on a near-goal ETA $eta_n$ that considers a part of the global path $P_g$ which is within the range R. FIG. 5 is a schematic block diagram of another example of ETA calculation for the mobile machine 100 of FIG. 3. In addition to obtain the current pose $s_0$ of the mobile machine 100 (block 510/410), obtain the global path(s) $P_g$ (block 520/420), obtain the local path(s) $P_l$ (block 530/430), the processing unit 110 further calculates a near-goal ETA $eta_n$ for each pair of the consecutive poses in the global path $P_g$ that are within the range R from the destination by performing the pose-to-pose ETA calculation on the pair of the consecutive poses and summing the calculated near-goal ETA $eta_n$ for all the pairs of the consecutive poses (block 570). Correspondingly, the processing unit 110 obtains the dynamic ETA by performing the pose-to-pose ETA calculation on each pair of the consecutive poses s in the local path $R_l$ that are without the range R (block 540), and the processing unit 110 obtains the baseline ETA by performing the pose-to-pose ETA calculation on each pair of the consecutive poses from the pose $s_{gc}$ in the global path $P_g$ that is closest to the last pose $s_{ll}$ in the local path $P_l$ to the first pose $s_{gn}$ in the global path $P_g$ that is within the range R from the destination (block 550), and then the processing unit 110 obtains the total ETA $eta_t$ to the destination based on the dynamic ETA etad, the baseline ETA $eta_b$, and the near-goal ETA $eta_n$ (block 560). In some embodiments, the processing unit 110 may calculate the total ETA $eta_t$ through an equation of:

$$eta_t = eta_d + eta_b + eta_n.$$

Furthermore, in the case that the local paths $P_l$ have taken obstacles into consideration while planned, it may add a small additive noise from, for example, noisy sensor data collected by the sensor subunit 133, into the calculate total ETA $eta_t$ so that the length of the local paths $P_l$ may vary at a comparably high rate (e.g., 10 Hz), hence the calculate total ETA $eta_t$ needs to be smoothed out. In some embodiments, the processing unit 110 may further smooth the total ETA $eta_t$ through Kalman filtering (block 580). For example, a linear Kalman filter may be used as a low pass filter to smooth out the total ETA $eta_t$.

The ETA calculating methods in FIG. 4A and FIG. 5 may be re-performed in response to predetermined condition(s) being met until the mobile machine 100 arrives the destination, so as to update the calculated ETA during the navigation of the mobile machine 100. In some embodiments, the processing unit 110 may further return to the obtaining the current pose $s_0$ of the mobile machine 100 (block 410/block 510) in response to the predetermined condition(s) being met until the mobile machine 100 arrives the destination. The predetermined condition(s) may include:

a specific interval (e.g., 1 second) for regularly updating the calculated ETA is timed out;

a new local path $P_l$ having been planned;

a new global path $P_g$ having been planned (for example, when the executing task is changed); and/or the global path(s) $P_g$ having been replanned for example, when an obstacle is detected).

In each re-performing of the ETA calculating method, a new current pose so of the mobile machine 100 will be obtained (block 510), a new global path(s) $P_g$ from the new current pose $s_0$ of the mobile machine 10 to the destination will be obtained (block 520), a new local path(s) $P_l$ that is planned based on the new global path(s) $P_g$ and the new current pose $s_0$ of the mobile machine 100 will be obtained (block 530), and new dynamic ETAs $eta_d$, new baseline ETA $eta_b$, new near-goal ETA $eta_n$ and new total ETA $eta_t$ will be calculated based on the new global path(s) $P_g$ and the new local path(s) $P_l$ (block 540, block 550, block 570, and block 560). Since the ETA calculating method will be re-performed at the specific interval and/or in response to the new local path $P_l$/global path $P_g$ being planned, the time increment can be dynamically captured within the specific interval and/or when the new local path $P_l$/global path $P_g$ is planned.

Figure 6:
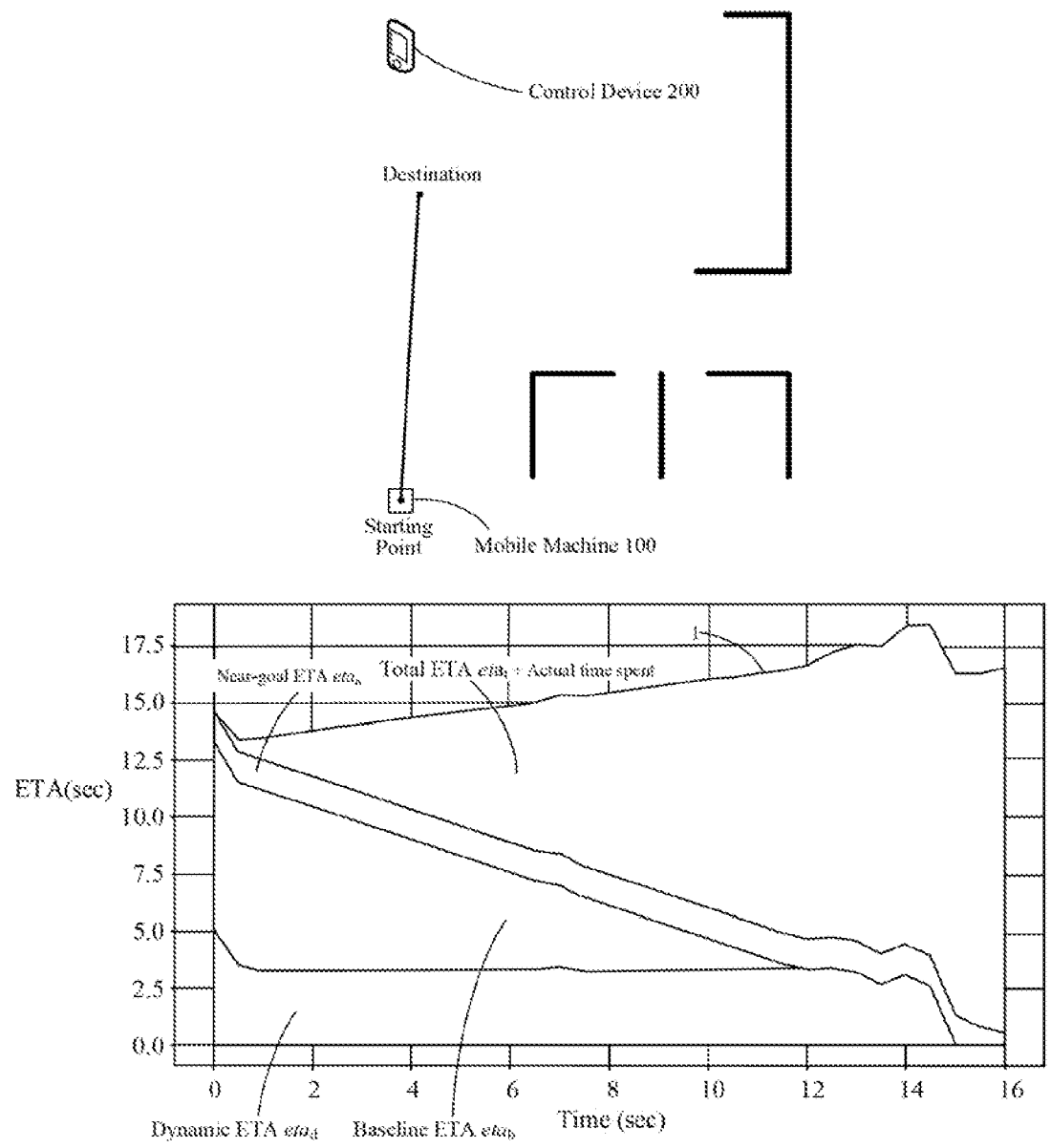
FIG. 6 is a schematic diagram of performing the ETA calculation of FIG. 5 in scenario I.

FIG. 6 is a schematic diagram of performing the ETA calculation of FIG. 5 in scenario I. The calculated ETA is shown by a coordinate system with x-axis as the actual time spend of the movement of the mobile machine 100 and y-axis as the calculate ETA at each time instance. In the coordinate system, the calculated dynamic ETA etad, baseline ETA $eta_b$, and near-goal ETA $eta_n$ are added on top of each other. In scenario I of the ETA calculation of the mobile machine 100, the mobile machine 100 is navigated to move from a starting point to a destination along a straight path. For an ideal ETA calculation, the sum of the total ETA $eta_t$ and the actual time spent should be a constant, that is, the line 1 representing the sum should be a horizontal straight line on the coordinate system. In this case, since the line 1 appears as a slight slope with a little ups and downs, the ETA calculation for the navigation along a straight path can be considered as close to the ideal ETA calculation.

Denote the total time spend for the mobile machine 100 to travel from the starting point to the destination as T, the arrival time from the current pose $s_0$ of the mobile machine 100 to the destination as $t_k$, and the time spend from the starting point to the current pose $s_0$ of the mobile machine 100 as $\tau_k$. While T is an unobservable constant until the end of the journey, $\tau_k$ is observable and meets the equation of $T = t_k + \tau_k$. Note that $\Delta t_k = \tau_k - \tau_{k-1}$ is also observable. After the mobile machine 100 reaches the destination, suppose N samples $(t_k, \tau_k)$ are obtained, where k=1, . . . , N, and $\hat{t}_k$ is an given value, $T = \tau_N$ is now observable. Then, the performance (i.e., the maximum absolute error for accuracy) of the ETA calculation method will be $$\max_k = |T - \tau_k - \hat{t}_k|.$$

Accordingly, in the 16 seconds navigation, there is an absolute error of ±2.5 seconds. It should be noted that, first, the constant positive slope on the line 1 (between 2-12 seconds) indicates that the mobile machine 100 is moved slower than its maximum linear speed. Second, the initial burst (<0.5 s) in the dynamic ETA $eta_d$ is because of the acceleration constraint of the mobile machine 100. Third, when reaching the destination (between 13-15 seconds), the burst of the total ETA $eta_t$ is due to local path does not end within the range R from the destination and redundant ETA is calculated.

Figure 7:
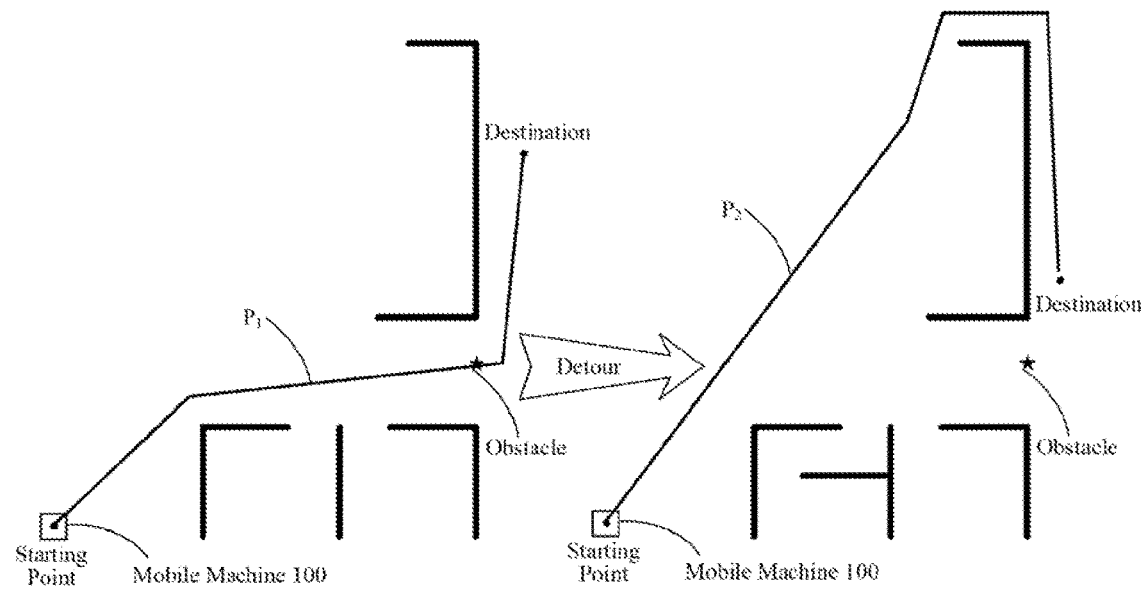
FIG. 7 is a schematic diagram of performing the ETA calculation of FIG. 5 in scenario II.
Figure 7:
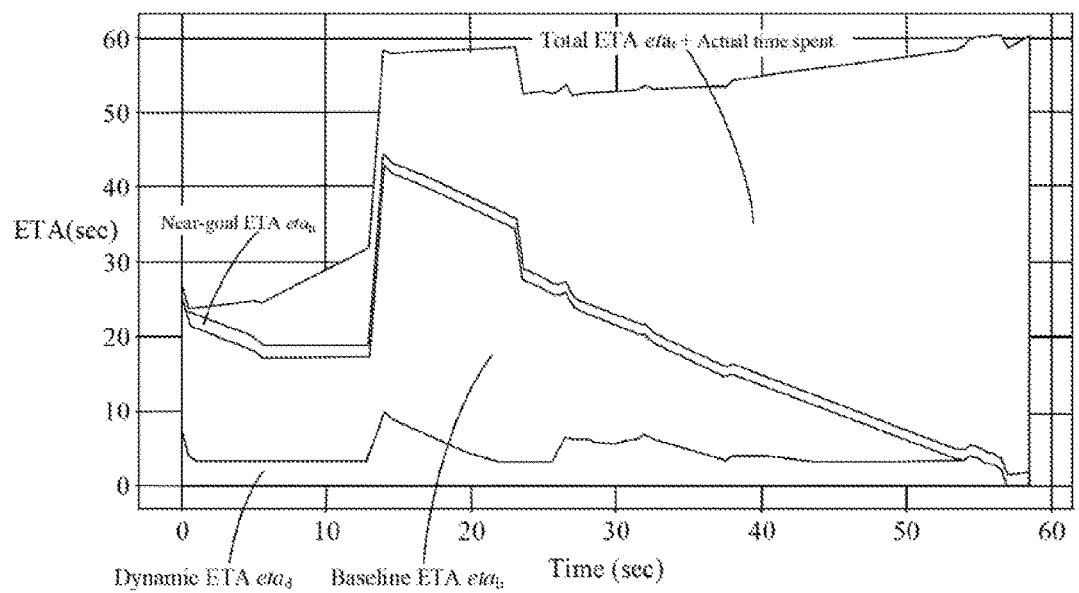

FIG. 7 is a schematic diagram of performing the ETA calculation of FIG. 5 in scenario II. In scenario II of the ETA calculation of the mobile machine 100, the mobile machine 100 is navigated to move from a starting point to a destination along the first path $P_1$ on the upper left first, and then along the second path $P_2$ on the upper right after detour by replanning the new path (i.e., the second path $P_2$) in response to being blocked by the obstacle. The calculated ETA is shown by a coordinate system on the lower part. In the 60 seconds navigation, there is an absolute error of ±2.4 seconds for the replanned path, and an absolute error of +25 seconds for the original path. It should be noted that, when the mobile machine 100 is blocked (between 4-14 seconds), the calculated ETA remains fixed because the residual path to the destination is unchanged, and the mobile machine 100 takes 8 seconds (within 4-14 seconds) to replan a path. In both scenario I and II, the maximum absolute error of the calculated the ETA $eta_t$ is less than 10 seconds (which achieve second-level estimation accuracy of smaller than or equal to 10 seconds), and the total ETA $eta_t$ is smoothly converged to 0 as the mobile machine 100 gradually reaches the destination, which meet the requirements for a good ETA calculation.

The ETA calculating methods in FIG. 4A and FIG. 5 are implemented based on the kinodynamic constraints of a mobile machine and its residual navigation path, which have advantages over the existing ETA calculation methods as follows. First, they have better accuracy because the absolute error of the calculated (total) ETA is within second-level estimation accuracy. Second, they are robust because the effect of the replanning of the global path is taken into consideration by dynamically capturing the time increment. Third, they are adaptable to different hardware prototypes and software navigation systems because they can be performed as long as key parameters such as kinodynamic constraints of the mobile machine are given. Fourth, they are light-weight (around 6 ms processing time on an ARM v8.2 CPU) because they are analyzation based, hence they are also scalable to 3D (e.g., aerial or underwater) navigations.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned ETA calculating method and mobile machine may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for calculating estimated time of arrival of a mobile machine to a destination, comprising:

receiving a request for the estimated time of arrival of the mobile machine to the destination, and obtaining a current pose of the mobile machine in response to the request;

obtaining a global path from the current pose of the mobile machine to the destination;

obtaining a local path planned based on the global path and the current pose of the mobile machine, wherein the local path and the global path comprise a plurality of poses for the mobile machine;

calculating a dynamic estimated time of arrival for each pair of consecutive poses in the local path by performing a calculation of a pose-to-pose estimated time of arrival on the each pair of the consecutive poses in the local path, and summing the calculated dynamic estimated time of arrival for all the pairs of the consecutive poses in the local path to obtain a summed dynamic estimated time of arrival, wherein the pose-to-pose estimated time of arrival is a duration of a movement of the mobile machine between a pair of consecutive poses;

calculating a baseline estimated time of arrival for each pair of consecutive poses between a first pose and a second pose in the global path by performing the calculation of the pose-to-pose estimated time of arrival on the each pair of the consecutive poses between the first pose and the second pose in the global path, and summing the calculated baseline estimated time of arrival for all the pairs of the consecutive poses between the first pose and the second pose in the global path to obtain a summed baseline estimated time of arrival, wherein the first pose is a pose closest to a last pose in the local path among the plurality of poses in the global path, and the last pose in the local path is a pose closest to the destination among the plurality of poses in the local path, and wherein the second pose is a pose closest to the destination among the plurality of poses in the global path;

obtaining a total estimated time of arrival of the mobile machine to the destination based on the summed dynamic estimated time of arrival and the summed baseline estimated time of arrival; and navigating, by a navigation system of the mobile machine, the mobile machine according to the total estimated time of arrival of the mobile machine to the destination.

2. The method of claim 1, further comprising:

calculating a near-goal estimated time of arrival for each pair of consecutive poses in the global path within a range from the destination by performing the calculation of the pose-to-pose estimated time of arrival on the each pair of the consecutive poses in the global path within the range, and summing the calculated near-goal estimated time of arrival for all the pairs of the consecutive poses in the global path within the range to obtain a summed near-goal estimated time of arrival;

wherein, in the calculating dynamic estimated time of arrival, the dynamic estimated time of arrival is obtained by performing the calculation of the pose-to-pose estimated time of arrival calculation on each pair of consecutive poses in the local path without the range;

wherein, in the calculating the baseline estimated time of arrival, the baseline estimated time of arrival is obtained by performing the calculation of the pose-to-pose estimated time of arrival on each pair of consecutive poses from a pose in the global path closest to a last pose in the local path to a first pose in the global path within the range from the destination, wherein the last pose in the local path within the range is a pose closest to the destination in the local path within the range, and the first pose in the global path within the range is a pose farthest from the destination in the global path within the range; and wherein, the total estimated time of arrival of the mobile machine to the destination is obtained based on the summed dynamic estimated time of arrival, the summed baseline estimated time of arrival, and the summed near-goal estimated time of arrival.

3. The method of claim 1, wherein the calculation of the pose-to-pose estimated time of arrival comprises:

calculating an orientation difference of each pair of consecutive poses;

calculating a turning radius of each pair of consecutive poses based on the orientation difference; and calculating an estimated time of arrival for each pair of consecutive poses based on the orientation difference, the turning radius, a maximum linear speed of the mobile machine, and a maximum angular speed of the mobile machine.

4. The method of claim 3, wherein the calculating the estimated time of arrival for the each pair of consecutive poses based on the orientation difference, the turning radius, the maximum linear speed of the mobile machine, and the maximum angular speed of the mobile machine, comprises:

calculating the estimated time of arrival dt for the each pair of consecutive poses through an equation of:

$$dt = \max(rd\theta/v_{max}, d\theta/\omega_{max});$$

where, r is the turning radius, $d\theta$ is the orientation difference, $v_{max}$ is the maximum linear speed of the mobile machine, and $\omega_{max}$ is the maximum angular speed of the mobile machine.

5. The method of claim 1, wherein the calculation of the pose-to-pose estimated time of arrival comprises:

calculating an orientation difference of each pair of consecutive poses;

calculating a turning radius of each pair of consecutive poses based on the orientation difference;

calculating an estimated time of arrival dt for each pair of consecutive poses through an equation of:

$$dt = \max(rd\theta/v_{max}, d\theta/\omega_{max}, (-v'+\text{sqrt}(v'v'+2a_{max}rd\theta))/a_{max}, (-w'+\text{sqrt}(w'w'+2\alpha_{max}d\theta))/\alpha_{max});$$

where, r is the turning radius, $d\theta$ is the orientation difference, $v_{max}$ is the maximum linear speed of the mobile machine, and $\omega_{max}$ is the maximum angular speed of the mobile machine, $v'=rd\theta/dt$, $w'=d\theta/dt$, $a_{max}$ is a maximum linear acceleration of the mobile machine, and $\alpha_{max}$ is a maximum angular acceleration of the mobile machine.

6. The method of claim 1, further comprising:

smoothing the total estimated time of arrival through Kalman filtering.

7. The method of claim 1, wherein the global path is replanned in response to the global path being blocked.

8. The method of claim 1, wherein after the obtaining the total estimated time of arrival to the destination, further comprises:

re-executing to the obtaining the current pose of the mobile machine in response to a predetermined condition being met until the mobile machine arrives the destination.

9. A system, comprising:

a mobile machine calculating estimated time of arrival of the mobile machine to a destination; and a device receiving the calculated estimated time of arrival of the mobile machine to the destination;

wherein, the mobile machine comprises:

one or more processors; and memory storing one or more programs configured to be executed by the one or more processors, wherein the one or more programs include instructions to:

receive a request for the estimated time of arrival of the mobile machine to the destination, and obtain a current pose of the mobile machine in response to the request;

obtain a global path from the current pose of the mobile machine to the destination;

obtain a local path planned based on the global path and the current pose of the mobile machine, wherein the local path and the global path comprise a plurality of poses for the mobile machine;

calculate a dynamic estimated time of arrival for each pair of consecutive poses in the local path by performing a calculation of a pose-to-pose estimated time of arrival on the each pair of the consecutive poses in the local path, and sum the calculated dynamic estimated time of arrival for all the pairs of the consecutive poses in the local path to obtain a summed dynamic estimated time of arrival, wherein the pose-to-pose estimated time of arrival is a duration of a movement of the mobile machine between a pair of consecutive poses;

calculate a baseline estimated time of arrival for each pair of consecutive poses between a first pose and a second pose in the global path by performing the calculation of the pose-to-pose estimated time of arrival on the each pair of the consecutive poses between the first pose and the second pose in the global path, and sum the calculated baseline estimated time of arrival for all the pairs of the consecutive poses between the first pose and the second pose in the global path to obtain a summed baseline estimated time of arrival, wherein the first pose is a pose closest to a last pose in the local path among the plurality of poses in the global path, and the last pose in the local path is a pose closest to the destination among the plurality of poses in the local path, and wherein the second pose is a pose closest to the destination among the plurality of poses in the global path;

obtain a total estimated time of arrival of the mobile machine to the destination based on the summed dynamic estimated time of arrival and the summed baseline estimated time of arrival; and navigate the mobile machine according to the total estimated time of arrival of the mobile machine to the destination.

10. The system of claim 9, wherein the one or more programs further include instructions to calculate a near-goal estimated time of arrival for each pair of consecutive poses in the global path within a range from the destination by performing the calculation of the pose-to-pose estimated time of arrival on the each pair of the consecutive poses in the global path within the range, and sum the calculated near-goal estimated time of arrival for all the pairs of the consecutive poses in the global path within the range to obtain a summed near-goal estimated time of arrival;

wherein, in the calculating dynamic estimated time of arrival, the dynamic estimated time of arrival is obtained by performing the calculation of the pose-to-pose estimated time of arrival on each pair of consecutive poses in the local path without the range;

wherein, in the calculating the baseline estimated time of arrival, the baseline estimated time of arrival is obtained by performing the calculation of the pose-to-pose estimated time of arrival on each pair of consecutive poses from a pose in the global path closest to a last pose in the local path to a first pose in the global path within the range from the destination, wherein the last pose in the local path within the range is a pose closest to the destination in the local path within the range, and the first pose in the global path within the range is a pose farthest from the destination in the global path within the range; and wherein, the total estimated time of arrival of the mobile machine to the destination is obtained based on the summed dynamic estimated time of arrival, the summed baseline estimated time of arrival, and the summed near-goal estimated time of arrival.

11. The system of claim 9, wherein the calculation of the pose-to-pose estimated time of arrival comprises:

calculating an orientation difference of each pair of consecutive poses;

calculating a turning radius of each pair of consecutive poses based on the orientation difference; and calculating an estimated time of arrival for each pair of consecutive poses based on the orientation difference, the turning radius, a maximum linear speed of the mobile machine, and a maximum angular speed of the mobile machine.

12. The system of claim 11, wherein the calculating the estimated time of arrival for each pair of consecutive poses based on the orientation difference, the turning radius, the maximum linear speed of the mobile machine, and the maximum angular speed of the mobile machine, comprises:

calculating the estimated time of arrival dt for the each pair of consecutive poses through an equation of:

$$dt = \max(rd\theta/v_{max}, d\theta/\omega_{max});$$

where, $r$ is the turning radius, $d\theta$ is the orientation difference, $v_{max}$ is the maximum linear speed of the mobile machine, and $\omega_{max}$ is the maximum angular speed of the mobile machine.

13. The system of claim 9, wherein the calculation of the pose-to-pose estimated time of arrival comprises:

calculating an orientation difference of each pair of consecutive poses;

calculating a turning radius of each pair of consecutive poses based on the orientation difference;

calculating an estimated time of arrival dt for each pair of consecutive poses through an equation of:

$$dt = \max(rd\theta/v_{max}, d\theta/\omega_{max}, (-v'+\sqrt{v'v'+2a_{max}rd\theta}))/a_{max}, (-w'+\sqrt{w'w'+2\alpha_{max}d\theta}))/\alpha_{max});$$

where, $r$ is the turning radius, $d\theta$ is the orientation difference, $v_{max}$ is the maximum linear peed of the mobile machine, and $\omega_{max}$ is the maximum angular speed of the mobile machine, $v'=rd\theta/dt$, $w'=d\theta/dt$, $a_{max}$ is the maximum linear acceleration of the mobile machine, and $\alpha_{max}$ is the maximum angular acceleration of the mobile machine.

14. The system of claim 9, wherein the one or more programs further include instructions to smooth the total estimated time of arrival through Kalman filtering.

15. A mobile machine, comprising:

one or more sensors;

one or more processors; and memory storing one or more programs configured to be executed by the one or more processors, wherein the one or more programs include instructions to:

receive a request for an estimated time of arrival of the mobile machine to the destination, and obtain a current pose of the mobile machine through the one or more sensors in response to the request;

obtain a global path from the current pose of the mobile machine to the destination;

obtain a local path planned based on the global path and the current pose of the mobile machine, wherein the local path and the global path comprise a plurality of poses for the mobile machine;

calculate a dynamic estimated time of arrival for each pair of consecutive poses in the local path by performing a calculation of a pose-to-pose estimated time of arrival on the each pair of the consecutive poses in the local path, and sum the calculated dynamic estimated time of arrival for all the pairs of the consecutive poses in the local path to obtain a summed dynamic estimated time of arrival, wherein the pose-to-pose estimated time of arrival is a duration of a movement of the mobile machine between a pair of consecutive poses;

calculate a baseline estimated time of arrival for each pair of consecutive poses between a first pose and a second pose in the global path by performing the calculation of the pose-to-pose estimated time of arrival on the each pair of the consecutive poses between the first pose and the second pose in the global path, and sum the calculated baseline estimated time of arrival for all the pairs of the consecutive poses between the first pose and the second pose in the global path to obtain a summed baseline estimated time of arrival, wherein the first pose is a pose closest to a last pose in the local path among the plurality of poses in the global path, and the last pose in the local path is a pose closest to the destination among the plurality of poses in the local path, and wherein the second pose is a pose closest to the destination among the plurality of poses in the global path;

obtain a total estimated time of arrival of the mobile machine to the destination based on the summed dynamic estimated time of arrival and the summed baseline estimated time of arrival; and navigate the mobile machine according to the total estimated time of arrival of the mobile machine to the destination.

16. The mobile machine of claim 15, wherein the one or more programs further include instructions to calculate a near-goal estimated time of arrival for each pair of consecutive poses in the global path within a range from the destination by performing the calculation of the pose-to-pose estimated time of arrival on the each pair of the consecutive poses in the global path within the range, and sum the calculated near-goal estimated time of arrival for all the pairs of the consecutive poses in the global path within the range to obtain a summed near-goal estimated time of arrival;

wherein, in the calculating dynamic estimated time of arrival, the dynamic estimated time of arrival is obtained by performing the calculation of the pose-to-pose estimated time of arrival on each pair of consecutive poses in the local path without the range;

wherein, in the calculating the baseline estimated time of arrival, the baseline estimated time of arrival is obtained by performing the calculation of the pose-to-pose estimated time of arrival on each pair of consecutive poses from a pose in the global path closest to a last pose in the local path to a first pose in the global path within the range from the destination, wherein the last pose in the local path within the range is a pose closest to the destination in the local path within the range, and the first pose in the global path within the range is a pose farthest from the destination in the global path within the range; and wherein, the total estimated time of arrival of the mobile machine to the destination is obtained based on the summed dynamic estimated time of arrival, the summed baseline estimated time of arrival, and the summed near-goal estimated time of arrival.

17. The mobile machine of claim 15, wherein the calculation of the pose-to-pose estimated time of arrival comprises:

calculating an orientation difference of each pair of consecutive poses;

calculating a turning radius of each pair of consecutive poses based on the orientation difference; and calculating an estimated time of arrival for each pair of consecutive poses based on the orientation difference, the turning radius, a maximum linear speed of the mobile machine, and a maximum angular speed of the mobile machine.

18. The mobile machine of claim 17, wherein the calculating the estimated time of arrival for each pair of consecutive poses based on the orientation difference, the turning radius, the maximum linear speed of the mobile machine, and the maximum angular speed of the mobile machine, comprises:

calculating the estimated time of arrival dt for the each pair of consecutive poses through an equation of:

$$dt = \max(rd\theta/v_{max}, d\theta/\omega_{max});$$

where, r is the turning radius, $d\theta$ is the orientation difference, $v_{max}$ is the maximum linear speed of the mobile machine, and $\omega_{max}$ is the maximum angular speed of the mobile machine.

19. The mobile machine of claim 15, wherein the calculation of the pose-to-pose estimated time of arrival comprises:

calculating an orientation difference of each pair of consecutive poses;

calculating a turning radius of each pair of consecutive poses based on the orientation difference;

calculating an estimated time of arrival dt for each pair of consecutive poses through an equation of:

$$dt = \max(rd\theta/v_{max}, d\theta/\omega_{max}, (-v' + \sqrt{v'v' + 2a_{max}rd\theta}))/a_{max}, (-w' + \sqrt{w'w' + 2\alpha_{max}d\theta}))/\alpha_{max});$$

where, r is the turning radius, $d\theta$ is the orientation difference, $v_{max}$ is the maximum linear peed of the mobile machine, and $\omega_{max}$ is the maximum angular speed of the mobile machine, $v' = rd\theta/dt$, $w' = d\theta/dt$, $a_{max}$ is the maximum linear acceleration of the mobile machine, and $\alpha_{max}$ is the maximum angular acceleration of the mobile machine.

20. The mobile machine of claim 15, wherein the one or more programs further include instructions to smooth the total estimated time of arrival through Kalman filtering.

* * * * *